United States Patent [19]
Burggraf

[11] 3,844,343
[45] Oct. 29, 1974

[54] IMPINGEMENT-CONVECTIVE COOLING SYSTEM
[75] Inventor: Frederick Burggraf, Cincinnati, Ohio
[73] Assignee: General Electric Company, Cincinnati, Ohio
[22] Filed: Feb. 2, 1973
[21] Appl. No.: 329,043

[52] U.S. Cl.......................... 165/109, 165/1, 34/20, 415/116
[51] Int. Cl............................................ F28f 13/02
[58] Field of Search .................... 165/1, 109; 34/20; 415/115, 116, 117; 416/90

[56] References Cited
OTHER PUBLICATIONS
Kercher et al., DM Heat Transfer, by ... Air Jets ..., ASME Paper No. 69-GT-4 of The Gas Turbine Conf., Clev., Ohio, 3/1969.
Decbber et al., BEL Thick Orifices, Proc. Instn. Mechn. Engrs., 1965-1966, Vol. 180, Pt. 3J, Paper No. 7, 4/1966.

Primary Examiner—Albert W. Davis Jr.
Attorney, Agent, or Firm—Derek P. Lawrence; Lee H. Sachs

[57] ABSTRACT

A heated plate is cooled by cooling fluid impinging thereon from a plenum partially defined by a second plate spaced therefrom. Apertures in the latter plate provide communication between the plenum and the cooled plates. For the purpose of increasing cool fluid heat transfer of the impinging jets, each of the apertures is provided with a varied diameter along its length, the smallest diameter extending over a given portion of the aperture length to form a throat. The ratio of throat length over throat diameter is less than 0.35. The aperture cross section between the throat and maximum diameter may be of any convenient configuration, for example conical or counterbored.

9 Claims, 5 Drawing Figures

PATENTED OCT 29 1974　　　　　　　　　3,844,343
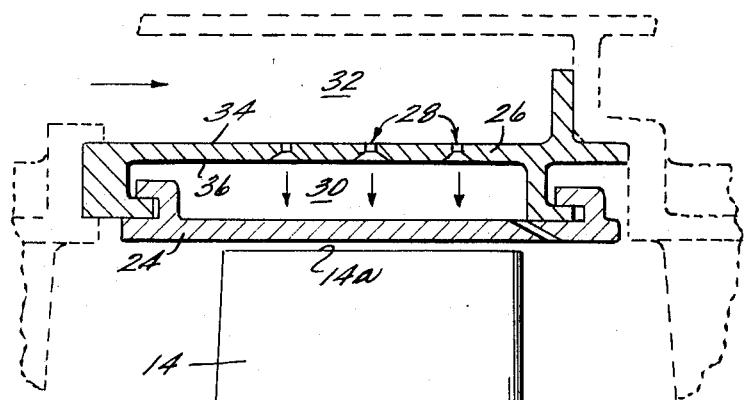
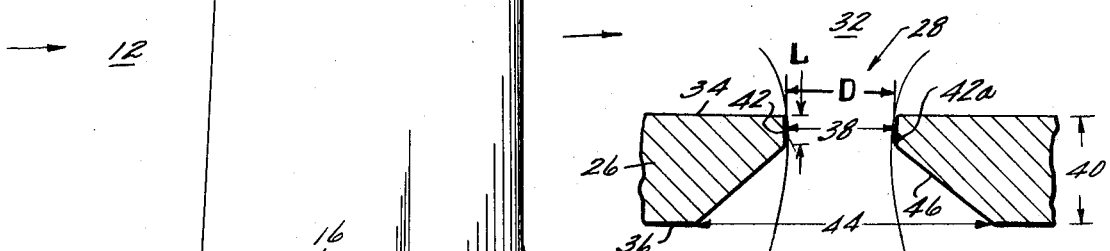
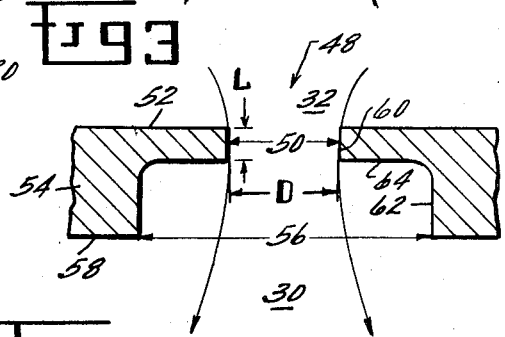
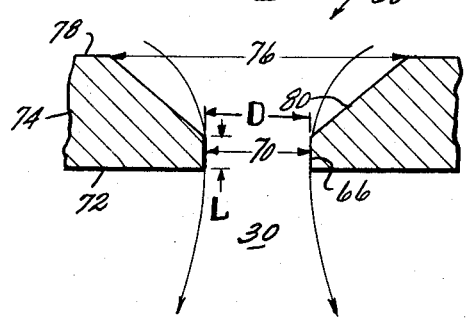
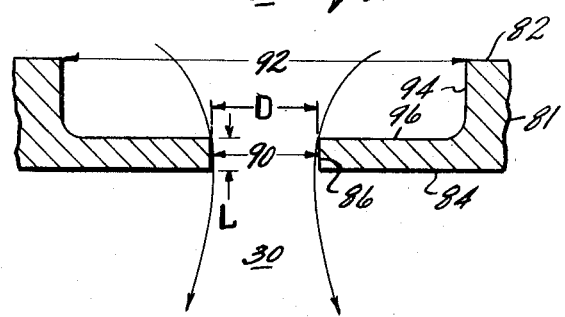

IMPINGEMENT-CONVECTIVE COOLING SYSTEM

BACKGROUND OF THE INVENTION

This invention relates to cooling systems for heated plates and, more particularly, to improved impingement cooling for heated surfaces in gas turbine engines.

The invention herein described was made in the course of or under a contract, or a subcontract thereunder, with the United States Department of the Air Force.

Certain portions of gas turbine engines operate at extremely high temperatures. For example, shrouds encircling rotating turbine elements are exposed to the direct heat of the burning gases. Systems for cooling such elements while maintaining overall engine efficiency are desirable. One highly effective cooling system involves the disposition of a cooling fluid plenum in circumscribing relationship about the circumference of such a shroud. The plenum is partially defined by a substantially annular plate or liner disposed in spaced relationship with the shroud. The plate is provided with a plurality of apertures providing communication between the plenum and shroud for the passage of cooling fluid thereupon in a plurality of impinging jets.

In the past, this arrangement has operated quite well to cool shrouds and similar elements. However, constantly increasing demands for performance of gas turbine engines leads to demands for cooling efficiency improvements for the reason that cooling fluid diverted from other parts of the engine has a negative affect upon overall engine efficiency. The present invention improves the efficiency with which a given quantity of cooling fluid transfers heat from heated elements with the result that less cooling fluid is required to cool a given heated element.

BRIEF SUMMARY OF THE INVENTION

It is therefore a primary object of the present invention to provide an improved impingement-convective cooling system for utilization in gas turbine engines and other apparatus which operates efficiently and requires reduced quantities of cooling fluid to perform a given amount of cooling.

In order to accomplish this and other objects which will become apparent hereinafter, the present invention, in one form thereof, provides a cooling fluid plenum partially defined by an apertured first plate (typically, a liner) disposed proximate a heated plate (typically, a shroud) to be cooled. The apertures provide communication between the plenum and the heated shroud for the cooling of the shroud by means of a plurality of impinging jets operating in convective heat transfer. Each aperture in the liner has a given length corresponding to the thickness of the liner and a diameter which varies along that length. A small first diameter for metering the cooling fluid flow extends along a portion of the aperture length and defines a throat. A second and larger diameter, at a second point along the aperture length, serves to diffuse the cool fluid flow within the aperture and to promote turbulent flow within each of the impinging jets downstream of the liner. In this way, the turbulence of the overall cool fluid flow is increased, and along with it the heat transfer efficiency of the fluid. The relationship of the throat length to the small aperture (throat) diameter is such that the ratio of these two dimensions is less than 0.35.

BRIEF DESCRIPTION OF THE DRAWING

The present invention will be more clearly understood with reference to the following description taken in combination with the drawing wherein:

FIG. 1 is a cross-sectional representation of a simplified turbine rotor shroud and associated rotor blades incorporating the present invention;

FIG. 2 depicts an enlarged sectional view of a portion of FIG. 1;

FIG. 3 depicts an alternative embodiment of the present invention;

FIG. 4 depicts another alternative embodiment of the present invention; and

FIG. 5 depicts still a further embodiment of the present invention.

DETAILED DESCRIPTION OF A PREFERRED EMBODIMENT

The present invention will be described particularly with respect to one type of heated structure within gas turbine engines. It can be appreciated that the concepts of the present invention are capable of broad application, not necessarily limited to the environment herein described nor to gas turbine engines in general.

Referring now to FIG. 1, one embodiment of the present invention is depicted in the environment of a turbine shroud of a gas turbine engine. Included are a hot gas passage 12, airfoil turbine rotor blade 14, blade platform 16, shank 18, root 20 and mating turbine rotor wheel 22. Blade 14 is one of a plurality of similar blades spaced circumferentially about wheel 22. Circumscribing this plurality of turbine blades is a turbine shroud 24 which serves to cooperate with platform 16 to define the radial boundary of hot gas passage 12. Spaced from shroud 24 is an apertured liner or second plate 26 bearing a plurality of apertures 28. The space between shroud 24 and liner 26 forms a cooling fluid passage 30 into which a plurality of jets of impinging cooling fluid are directed for the purpose of impinging and convectively cooling shroud 24. Surrounding the liner 26 is a cooling fluid plenum 32 into which is fed a supply of cooling fluid (in this embodiment, air) from an upstream compressor (not shown).

The engine of FIG. 1 operates in a typical manner wherein a quantity of fuel is burned within a combustor (not shown) and is expelled into the hot gas passage 12 in the direction shown and into engagement with blade 14 which serves to rotate wheel 22, due to its airfoil configuration. A portion of the kinetic energy of the gas stream thus extracted is used to operate the upstream compressor mentioned which provides a quantity of compressed air to plenum 32 as well as to the combustion chamber. The remaining hot gas is passed downstream (toward the right in FIG. 1) and provides a thrust toward the left.

Shroud 24 serves to define hot gas passage 12 and to provide a substantial seal against leakage of the hot gas past the turbine blade tips 14a, which would result in an efficiency loss. Due to its proximity to the hot gas stream, the shroud reaches temperatures which require that it be cooled. This cooling is part of the function of the encircling liner 26 and plenum 32.

Referring now to FIG. 2, wherein an enlarged view of an individual aperture 28 of FIG. 1 is depicted, it can be seen that the liner 26 has first and second faces 34 and 36 bounding the plenum 32 and facing the shroud 24, respectively. The aperture 28 has a first diameter 38 disposed proximate face 34. This first diameter extends in the direction of the aperture length 42 (which corresponds to the thickness of liner 26). The length of small diameter (throat diameter) 38 defines a throat 42 of predetermined length through which cooling fluid is metered at a predetermined rate.

Aperture 28 is further provided with a second and wider diameter 44 disposed proximate face 36 of the liner. Diameter 44 is substantially larger than diameter 38, and the two are joined in this embodiment by a substantially conical aperture wall portion 46. In this fashion, the aperture 28 extends at a substantially constant cross-sectional area (corresponding to throat diameter 38) for a distance between face 34 and a point along the aperture length, this distance forming the throat 42, From this point, the cross-sectional area increases steadily reaching a maximum at face 36 whereat diameter 44 is reached.

In operation, the cooling fluid passing from plenum 32 through aperture 28 and into the cooling fluid passage 30, is limited in its quantity or rate of flow by the metering of throat 42. Having reached the downstream edge 42a of throat 42 (at its intersection with conical aperture wall portion 46) the cross-sectional area through which the fluid may flow rapidly increases so that the velocity profile achieved within throat 42 is radically disturbed. This disturbance introduces substantially turbulent flow within the fluid passing through the aperture and prevents the formation of a smooth velocity profile, as in laminar flow. It has been found that turbulence is induced quite well when the ratio of length L of throat 42 to diameter D of the throat diameter 38 of the aperture is maintained below 0.35. Experiments have shown that cooling efficiency is improved by as must as 25 percent when this ratio limitation is maintained.

While a similar ratio could be obtained by the utilization of large apertures of constant cross-sectional areas, through liners of very thin widths, it has also been found that structural strength requirements demand liners of substantial thickness, and also that effective metering of cooling fluid flow requires a relatively small aperture diameter. The combination of these two limitations prevents the effective utilization of a constant diameter aperture with an L/D ratio below 0.35.

When the L/D ratio exceeds 0.35, the throat becomes of sufficient length to permit the development of a relatively smooth velocity profile in the throat prior to exiting, within which state the cool fluid is less capable of removing heat from shroud 24 upon impingement therewith in a plurality of individual fluid jets.

Referring now to FIG. 3, a second embodiment of the present invention id depicted. In this embodiment, an aperture 48 is provided with a first and smallest (throat) diameter 50 near a plenum-bounding face 52 of a liner 54. A second and larger diameter 56 of the aperture is disposed proximate the second or shroud-facing face 58 of the liner 54. A portion of the aperture length is maintained at a constant cross-sectional area corresponding to throat diameter 50 and defines a throat 60 for metering the fluid. Similarly, the larger diameter 56 is maintained over a portion of the aperture length thereby forming a second constant cross-sectional area portion defining a counterbore region 62. The counterbore and throat are connected by a substantially planare connection at 64. The dimensions of the configuration are selected so that the length L of throat 60 divided by diameter D, the throat diameter 50, yeilds a ratio below 0.35.

Functionally, this embodiment operates substantially similarly to that described above in that it permits the use of a liner of substantial thickness while maintaining desired L/D ratio. In this way, a fully developed velocity profile is not achieved within throat 60 wth the result that, as the walls of throat 60 fall away upon entering the counterbore region 62, the flow area increases and turbulent flow is enhanced. Thus, the cool fluid impinges on the opposed heated shroud and operates in turbulent flow to increase cooling efficiency without increasing total cool fluid flow.

FIG. 4 teaches an embodiment of the present invention which is generally similar to that of FIG. 2, but wherein the aperture configuration has been reversed relative to the direction of the cool fluid flow. More particularly, a throat 66, defined by a constant area portion of aperture 68 having a throat diameter 70, is disposed proximate the shroudfacing face 72 of liner 74. The larger diameter 76 is disposed proximate the plenum-bounding face 78 of the liner and is connected to the throat by means of a substantially conical aperture wall portion 80. Once again, the ratio of throat length L of throat 66 over diameter D at throat diameter 70 is less than 0.35.

The function of this embodiment is once again the same, wherein the cool fluid is passed through the throat 66 which is of such a short length (relative to the diameter of the aperture at throat diameter 70) that a fully developed velocity profile cannot be achieved within the throat. Hence, upon removal of the restraints of the throat wall 66, the cool fluid is more turbulent and operates to increase cooling efficiency.

FIG. 5 depicts an embodiment which is substantially a reversed aperture as disclosed in FIG. 3. In this embodiment, liner 81 having plenum-bounding face 82 and shroud-facing face 84 includes a throat 86 which defines a constant area section of aperture 88. The throat has a diameter 90 and is located near face 84. The aperture has a second and larger diameter 92 which extends from face 82 inwardly to define a substantially constant cross-sectional area counterbore 94. The counterbore is connected with the throat by means of a substantially planar surface 96. The dimensional relationship is once again such that the L/D ratio is less than 0.35. Furthermore, the function of this embodiment is substantially similar to those which have been described hereinabove.

The present invention has thus been described with respect to various embodiments. Clearly, the concepts of this invention are of such breadth as not to be limited to those embodiments nor even to the environment within which the embodiments have been presented. For example, the relationships of the dimensions of the apertures utilized can be varied without adversely affecting overall performance so long as the L/D ratio is maintained at less than 0.35. The remaining dimensions have substantially less affect upon cooling efficiency. For this reason, the throat may be disposed at any point along the aperture length and its connection with the larger diameters can be performed by any particular wall shape suitable for easy fabrication and maintenance. As a further example of variation, the cooling system of the present invention is not necessarily limited to gas turbine engine utilization. Electrical motors and generators develop substantial heat which must be dissipated to protect machine parts. The impingement cooling system presented herein would perform this function quite well.

Such variations, as well as those which will be apparent to those skilled in the art, are within the spirit of the present invention.

What is claimed as new and desired to be secured by Letters Patent of the United States is:

1. An impingement-convective cooling system for directing a flow of cooling fluid from a plenum partially defined by a first plate against a heated opposed second plate for the cooling of the second plate, the system comprising:
   an aperture in the first plate, the aperture having a predetermined aperture length corresponding to the thickness of the first plate,
   a first diameter for metering cooling fluid flow at a first point along the aperture length, a second and larger diameter at a second point along the aperture length, the first diameter extending along a predetermined portion of said aperture length to form a throat, the ratio of the throat length to said first diameter being less than 0.35.

2. The cooling system of claim 1 wherein the first plate further comprises first and second faces, the first face bounding the plenum, and the second face facing the second plate, and wherein the throat is disposed proximate the first face.

3. The cooling system of claim 2 wherein the first diameter is disposed proximate the first face.

4. The cooling system of claim 3 wherein the second diameter is connected to the throat by a substantially conical aperture wall portion.

5. The cooling system of claim 3 wherein the second diameter extends along a predetermined portion of said aperture length forming a counter bore.

6. The cooling system of claim 1 wherein the first plate further comprises first and second faces, the first face bounding the plenum, and the second face facing the second plate, and wherein the throat is disposed proximate the second face.

7. The cooling system of claim 6 wherein the second diameter is disposed proximate the first face.

8. The cooling system of claim 7 wherein the second diameter extends along a predetermined portion of said aperture length forming a counterbore.

9. The cooling system of claim 7 wherein the second diameter is connected to the throat by a substantially conical aperture wall portion.

* * * * *